Aug. 16, 1955  R. F. E. STEGEMAN  2,715,258
METHOD OF MANUFACTURING TWO-TONE SPECTACLE FRONTS
Filed Nov. 8, 1952
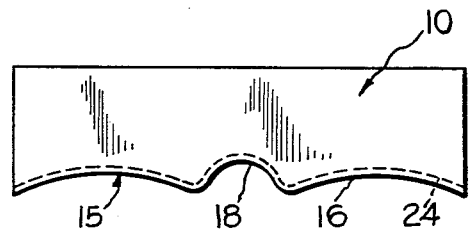
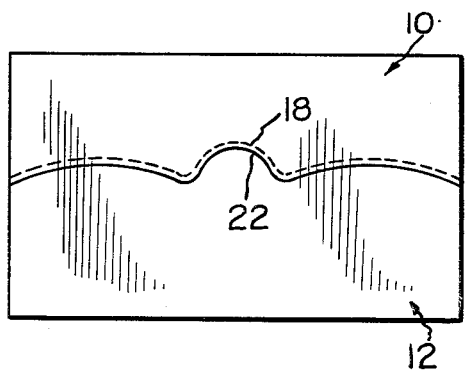
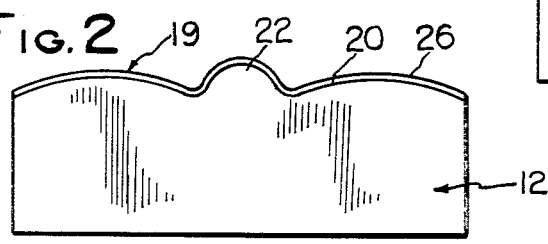
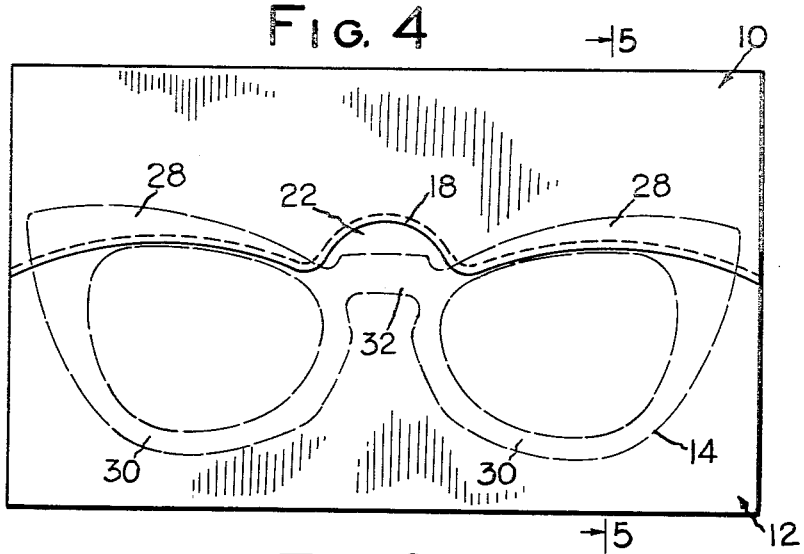
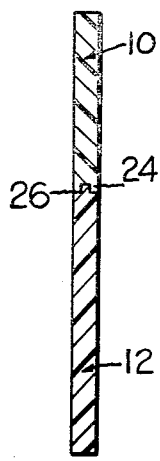
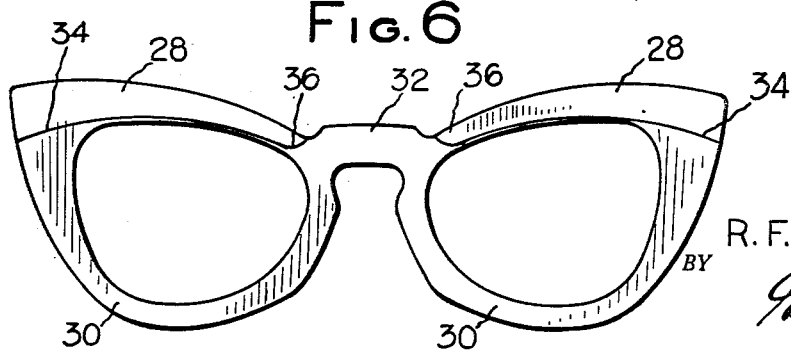
INVENTOR.
R. F. E. STEGEMAN
BY
ATTORNEY United States Patent Office 2,715,258
Patented Aug. 16, 1955

2,715,258
METHOD OF MANUFACTURING TWO-TONE SPECTACLE FRONTS

Raymond F. E. Stegeman, Greece, N. Y., assignor to Bausch & Lomb Optical Company, Rochester, N. Y., a corporation of New York Application November 8, 1952, Serial No. 319,449

1 Claim. (Cl. 29—20)

This invention relates to two-tone spectacle fronts and more particularly it has reference to a new method of making same.

One of the objects of this invention is to provide an improved method for making two-tone plastic spectacle fronts having the upper rim or brow portions formed of one color material and the bridge and remaining rim portions formed of material of a different color.

Other objects and advantages of the invention will become more apparent during the following description when taken in connection with the accompanying drawing, wherein is illustrated the type of spectacle front produced by the invention and the several steps followed in the process of making the same, and in which:

Fig. 1 is a plan view of one form of a shaped plastic part used in my invention.

Fig. 2 is a plan view of a mating part,

Fig. 3 is a plan view of a composite sheet formed by the assembled parts of Figs. 1 and 2 joined along the common edge.

Fig. 4 is a plan view of the composite sheet with a profile of a spectacle front laid out thereon.

Fig. 5 is a sectional view along the line 5—5 of Fig. 4.

Fig. 6 is a plan view of a finished spectacle front.

In the embodiment of the invention shown in the drawings, 10 designates an upper colored part and 12 designates a lower differently colored part. The upper colored part 10 may be made of any suitable material such as a plastic of the cellulose nitrate class known as "Zylonite" or the like. The lower edge 15 of part 10 is formed or made in a browline configuration or pattern 16 having a central re-entrant or offset portion 18 and a groove or other joint 24 along the full length thereof.

The lower part 12 is of a color or tone different from part 10 and is made of any suitable material, such as a plastic similar to the type disclosed for part 10. Along the upper edge 19 of part 12 is formed or made a mating configuration or pattern 20 having a projection or projecting bridge portion 22. The part 12 has a tongue or joint 26 formed along the edge 19 to fit into and mate with groove or joint 24 of part 10.

A composite sheet is formed when part 12 and part 10 are joined or united together in any suitable fashion along the common edge. A spectacle front is scribed in profile on the composite sheet as shown at 14 so as to have the brow or upper rim portions 28 in the one colored material of the upper part 10 and the lower or remaining rim portions 30 scribed in the different colored material of part 12. Since the bridge portion 22 of the different colored plastic part projects into the area between the upper rim portions, the bridge piece 32 of the finished spectacle front will be of the same material as the lower rim encircling portions 30.

A spectacle front cut from the composite sheet will have the brow portions 28 made up of the material of part 10 with grooves 24 along the lower edge, and a lower portion formed of the different colored material of part 12 having complementary tongues 26 at the upper outside edge 34 and along the edge of the bridge at 36. The bridge piece 32 will be made of the same material as the rim portions 30 so that only the brow portions 28 will be differently colored, as shown in Fig. 6.

From the foregoing, it will be apparent that I am able to attain the objects of my invention and provide a new method of producing a novel spectacle front. Various modifications can, of course, be made without departing from the spirit of my invention or the scope of the appended claim.

I claim:

The method of producing a two-tone plastic spectacle front having apair of lens rims connected by a bridge comprising forming a composite sheet by uniting along adjacent edges one plastic sheet having a reentrant portion in the lower edge thereof spaced between the ends of the sheet with a differently colored plastic sheet having on its upper edge a centrally disposed projecting bridge portion fitting into said reentrant portion, scribing on said composite sheet the profile of a spectacle front with the upper portions of the lens rims scribed on the first-named plastic sheet on the opposite sides of the reentrant portion and the remaining portions of the spectacle front scribed on the differently colored plastic sheet with the spectacle bridge in the projecting bridge portion thereof, and cutting the composite sheet along the scribed profile to produce a two-tone spectacle front.

References Cited in the file of this patent

UNITED STATES PATENTS 2,594,395   Castelli _____ Apr. 29, 1952

FOREIGN PATENTS 429,888   Italy _____ Feb. 5, 1948
617,084   Great Britain _____ Feb. 1, 1949
895,342   France _____ Jan. 22, 1945
984,689   France _____ July 9, 1951